April 15, 1941.  J. A. ROCHÉ  2,238,782
GAUGING DEVICE FOR COMPLEX CURVED SURFACES
Filed Dec. 24, 1938  2 Sheets-Sheet 1
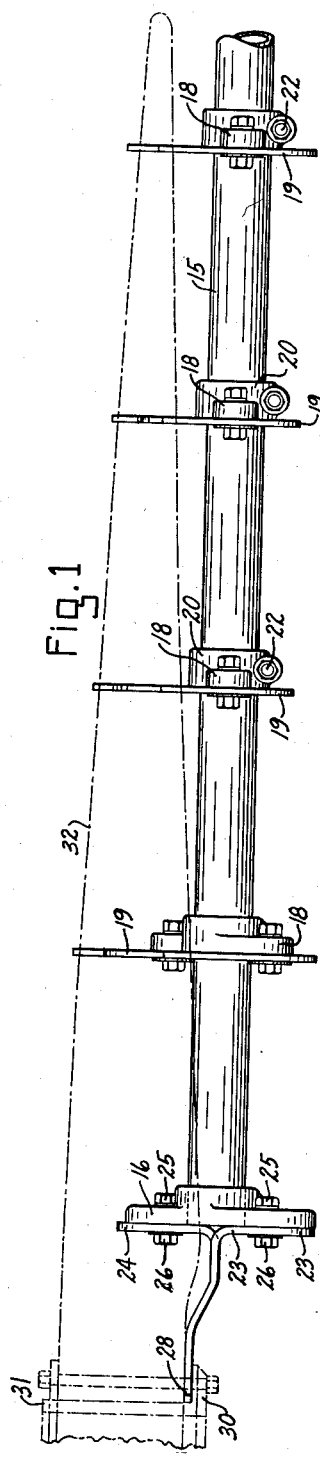
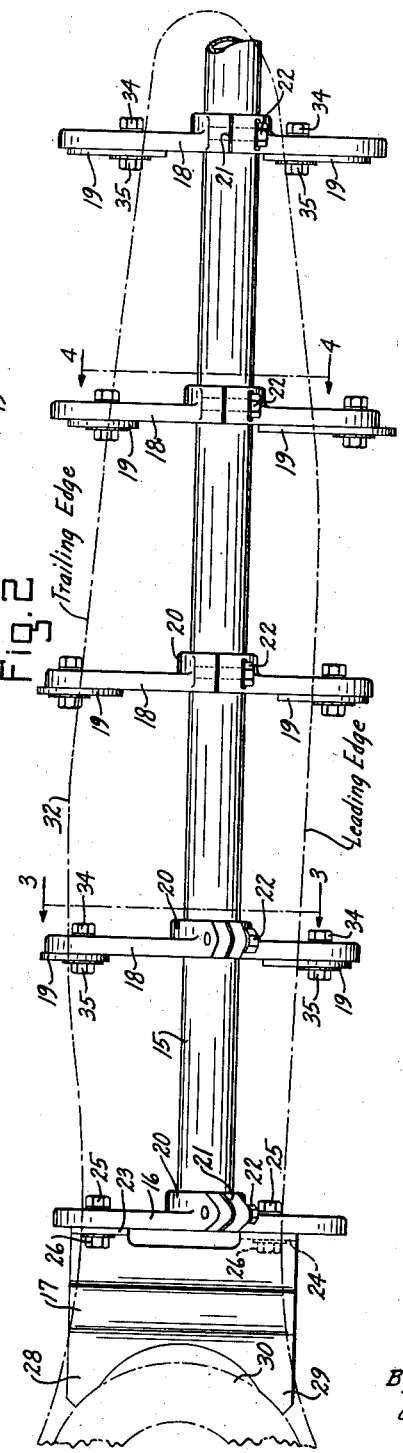
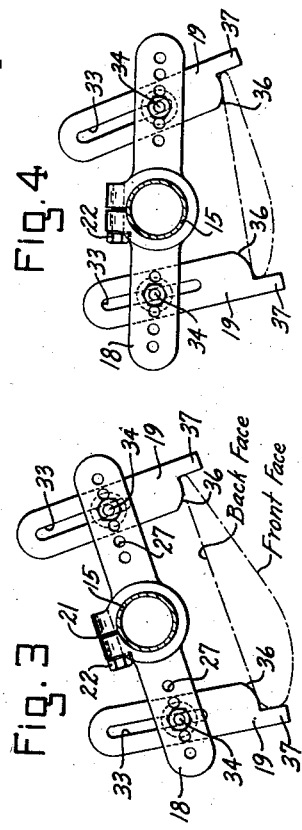
INVENTOR
JEAN A. ROCHÉ
By Richard Van Buren
HIS ATTORNEY April 15, 1941.                J. A. ROCHÉ                  2,238,782
                GAUGING DEVICE FOR COMPLEX CURVED SURFACES
                     Filed Dec. 24, 1938           2 Sheets-Sheet 2
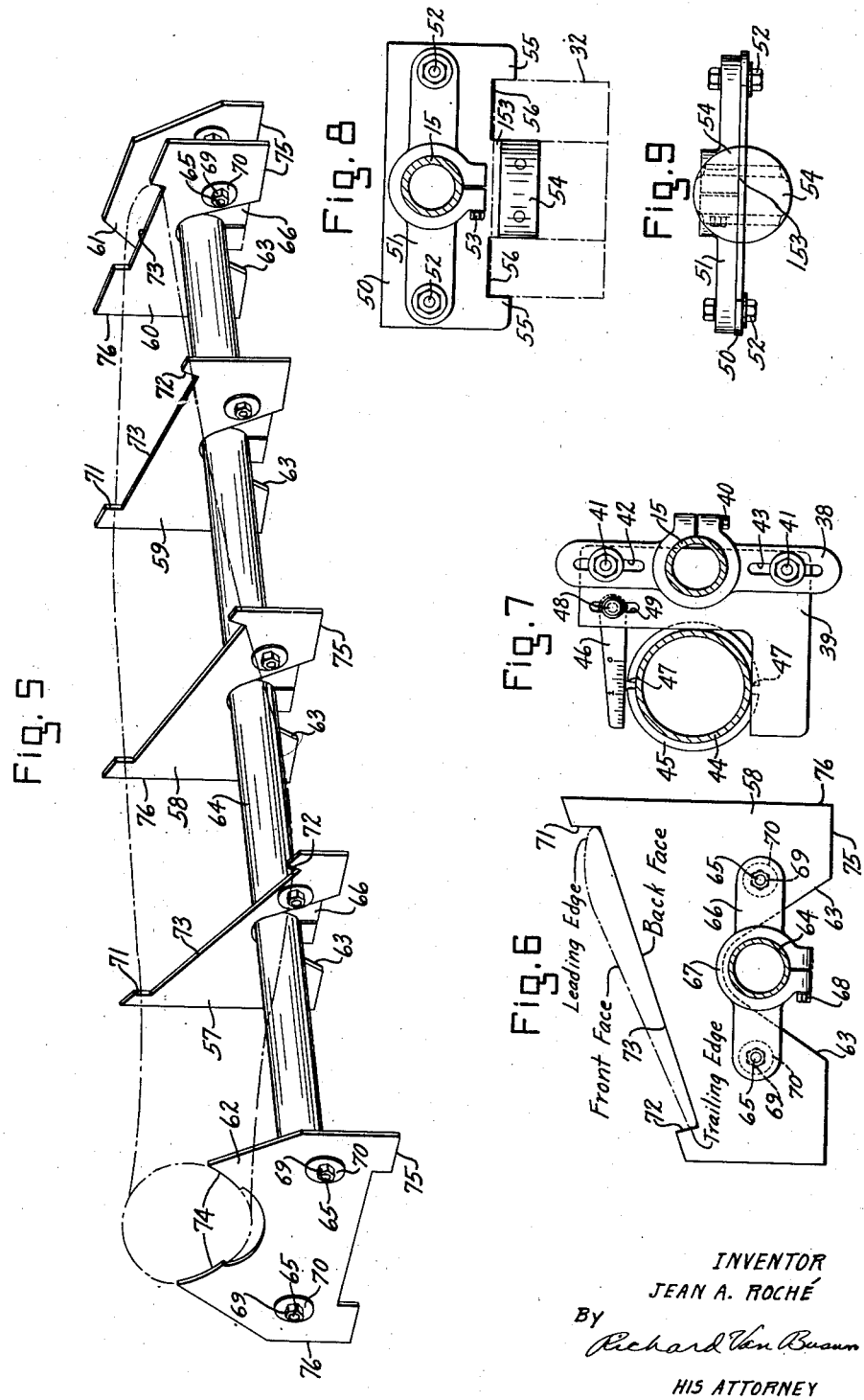
INVENTOR
JEAN A. ROCHÉ
By Richard Van Buren
HIS ATTORNEY Patented Apr. 15, 1941

2,238,782

UNITED STATES PATENT OFFICE 2,238,782

GAUGING DEVICE FOR COMPLEX CURVED SURFACES

Jean A. Roché, Dayton, Ohio

Application December 24, 1938, Serial No. 247,575

13 Claims. (Cl. 33—174)

This invention relates to a tool for gauging and comparing the blades of aircraft and marine propellers and other complex curved surfaces.

Throughout the ensuing specification the propeller gauge of this invention will be explained in connection with aircraft propellers. However, it is not the intention to limit this device to such use, as there are many other ways in which it may be used without departing from the spirit of the invention.

It is a well known fact that any variation in the contour of thrust of the different blades of a propeller will set up vibrations and unbalanced forces and moments which create roughness and which often result in the fatigue destruction of parts. Such out-of-balance conditions may be caused by warping of the blades of a wooden propeller, slipping of the blades of a metal propeller in their hubs, or twisting or bending of the blades due to accidents or due to stresses and strains set up in the process of aging, etc.

Heretofore the checking of a propeller to determine the cause of such unbalanced conditions required the removal of the propeller from the craft and the slow, tedious and expensive checking of the blades thereof against a drawing or master model by the use of surface plate, protractor, square and height gauge.

The present invention discloses a compact and readily portable propeller gauge which eliminates the removal of the propeller from the craft for checking and which also eliminates the use of the measuring tools referred to above.

Therefore, it is broadly an object of this invention to provide a gauge for checking the contour; pitch and thrust relationship of propeller blades, autogiro blades and other types of airfoil surfaces.

Another object is the provision of an easily portable gauge for checking the pitch and thrust relationship of the blades of aircraft propellers, autogiro blades and other types of airfoils, without removing such blades and airfoils from the aircraft.

Still another object is to supply a portable gauge having a series of templets which may be quickly and easily set to the pitch of one of the blades of an aircraft propeller for comparing such blade with the other blade or blades of said propeller without removing the propeller from the aircraft.

A further object is to provide a gauge for aircraft propellers and the like, having a plurality of settable fingers or templets which may be set to the peripheral form and pitch of one propeller blade for checking the peripheral form and pitch or thrust relationship of said blade with its companion blade or blades, while the propeller is in place on the aircraft.

A still further object is the provision of a gauge for aircraft propellers having a series of settable fingers substantially parallel to each other and situated at intervals corresponding to different radial sections of the propeller blades, said fingers adapted to be set to the peripheral form and pitch of one blade of a propeller or a master blade, for checking the peripheral form and pitch or thrust relationship of said blade or said master with the other blade or blades of said propeller.

Another object is to provide a gauge having a series of templets made to conform to the shape of different predetermined sections of a particular propeller blade or other airfoil for comparing said blade or said airfoil with other similar blades or airfoils.

A further object is the provision of means for locating the above propeller gauges in proper relation to the blades of aircraft propellers and the like when said propellers are removed from the aircraft or when said propellers are in place on said aircraft.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In said drawings:

Fig. 1 is a side view of a preferred form of gauge.

Fig. 2 is a plan view of a preferred form of gauge.

Fig. 3 is a detail sectional view taken along line 3—3 (Fig. 2) looking in the direction indicated by the arrows and shows in detail the gauging fingers and how they are adjusted in relation to the propeller blade being checked.

Fig. 4 is a sectional view similar to Fig. 3, taken along line 4—4 (Fig. 2) looking in the direction indicated by the arrows.

Fig. 5 is a perspective view of a modified form of gauge using solid templets instead of fingers for gauging different sections of propeller blades.

Fig. 6 is a detail view of one of the templets of Fig. 5 showing the means for mounting and adjusting same.

Fig. 7 is a detail view of one type of locating templet for the gauge of Figs. 1 and 5, and shows the scale device for checking the thrust relationship of the different blades of metal propellers.

Fig. 8 is a detail view of a locating templet for use in checking wooden propellers when they are removed from the aircraft.

Fig. 9 is a right-angle projection of the templet shown in Fig. 8.

Description

The preferred form of gauge shown in Figs. 1 to 4 inclusive, comprises a tubular support member 15, made of any suitable material but preferably of some lightweight alloy, an end casting 16 for supporting a locating templet 17, and four castings 18 for supporting a plurality of gauging fingers 19.

The castings 16 and 18, which may be made of the same material as the tube 15, are similar in outline and each has a hub portion 20 with a boring which is a slip fit on the tubular member 15. A split 21 in each of the hub portions 20, in cooperation with a clamping screw or bolt 22, forms a means for clamping the castings 16 and 18 in place on the tube 15.

The locating templet 17, which may be made of any suitable material, for example, steel, has oppositely formed ears 23 and 24 which are clamped against the face of the casting 16 by means of screws 25 and their associated nuts 26, said screws extending through suitable ones of two sets of holes 27 in opposite ends of said casting 16 and corresponding holes in the ears 23 and 24. If desired, slots such as shown in Fig. 7 may be substituted for the two sets of holes 27. Suitable clamping washers are inserted between the heads of the screws 25 and the casting 16 and between the nuts 26 and the ears 23 and 24.

An off-set portion of the templet 17 forms arcuate fingers 28 and 29 adapted to engage a flange 30 of a hub 31 of a propeller 32, here shown in dot and dash lines.

The gauging fingers 19 (Figs. 1 to 4) each has a slot 33 and each of the castings 18 has in opposite ends thereof a set of the holes 27 similar in every respect to those in the casting 16. Screws 34, which extend through the slots 33 and suitable ones of the holes 27, and their associated nuts 35, provide means for securing the fingers 19 in set positions. Suitable clamping washers are provided between the heads of the screws 34 and the fingers 19 and between the nuts 35 and the castings 18.

The fingers 19 have arcuate gauging surfaces 36 for contacting the back face of the blades of the propeller 32, said surfaces 36 having adjacent thereto projections 37 for contacting the leading and trailing edges of the propeller blades.

In using the gauge shown in Figs. 1 to 4 the casting 16 is securely clamped to the tube 15 and the locating templet 17 is secured to the casting 16; the arcuate fingers 28 and 29 are then placed in contact with the hub flange 30 of the propeller 32, which in this case is in place on the aircraft, the faces of said fingers being held firmly against the flat central or hub portion of the propeller, as shown in Fig. 1. Next the castings 18 are equally spaced along the tube 15 to cover substantially the full length of the propeller, adjusted radially to conform to the twist of the blade (see Fig. 3) and then clamped in place by means of the screws 22. The fingers 19 are then located in relation to the blade by means of the slots 33 and holes 27, the arcuate surfaces 36 and the projections 37 moved into contact respectively with the back face and leading and trailing edges of the blade, after which the screws 34 are tightened to secure said fingers in set positions, as shown best in Figs. 3 and 4.

After the gauge has been adjusted to one blade of the propeller, as described above, the other blade or blades may be compared therewith by simply removing the gauge therefrom and placing it on the other blade or blades. Any differences in the pitch or thrust relationship of the blades will be made manifest by clearance between the arcuate surfaces 36 and the back face of the blades, failure of the projections 37 to fit over the edges of the blades, or failure of the locating templet to properly engage the hub flange 30 and the central portion of the propeller.

The gauge as described above is preferably used in checking the blades of wooden propellers. For checking the blades of metal propellers the casting 16 and templet 17 (Fig. 2) are replaced by a casting 38 and a locating templet 39 (Fig. 7).

The casting 38 is similar in every respect to the casting 16 and is clamped to the tubular member 15 by a screw 40. The locating templet 39 is secured to the face of the casting 38 by two screws 41 and their respective nuts (not shown), said screws extending through clearance holes in said templet 39 and through diametrically opposed slots 42 and 43 in said casting 38. The clearance holes and slots provide means for adjusting right-angle gauging surfaces of the templet 39 in contact with the periphery of a shank 44 of a metal propeller blade, shown in dot and dash lines in Fig. 5, said shank being clamped in a boring of a propeller hub 45.

The linear location of the gauge to the blade is effected by contacting the end of the hub 45 with the portion of the face of the templet 39 adjacent the right-angle gauging surfaces.

After the templet 39 has been located, as described above, the fingers 19 (Figs. 1 to 4) are adjusted to contact the blade in the manner described hereinbefore. After the fingers 19 have been adjusted, a scale 46 is adjusted in relation to one of two diametrically opposed clamping splits 47 in the hub 45. The scale 46 is secured to the templet 39 by a screw 48 and its associated nut (not shown), said screw extending through a hole in the scale and a vertical slot 49 in said templet 39, said slot providing means for adjusting said scale in relation to said split 47.

After the gauge has been adjusted in relation to one of the blades of the metal propeller, the pitch and the thrust relationship of the other blade or blades thereto may be determined by simply placing the gauge thereon in the manner explained previously.

In this case the angular set or twist of the blades in the hub 45 may be compared by observing the dimensions on the scale 46 in relation to the split 47, as there is a similar split for each hub boring and all such splits are in exact relationship to each other.

In some cases the hubs, for metal propellers, do not have split-cuts such as 47 (Fig. 7), and in such cases reference lines may be scribed, in any suitable manner, upon the opposite hub portions for use in connection with the scale 46 in comparing the angular set of the blades.

Another type of locating templet 50 (Figs. 8 and 9) is provided for use on the gauge shown in Figs. 1 and 2 for checking the blades of wooden propellers when they are not attached to the aircraft and when the hub 31 is not assembled therein.

The templet 50 is secured to its supporting casting 51 by two screws 52 which extend through holes in said templet and are threaded in similar opposed arms of said casting 51. The casting 51 has a split hub with a boring therein which is a slip fit on the tube 15, said casting being clamped against displacement on said tube by a screw 53 which extends through a hole in an extension of the hub and threaded in a similar extension thereof, said extensions being adjacent the split in said hub.

An extension 153 in the center of the templet 50 has secured to opposite sides thereof two identical sectors 54 which together form a round plug adapted to fit snugly in the hub boring of the propeller 32. Two similar extensions 55 of the templet 50 are diametrically opposed to the center of the sectors 54 and are adapted to fit snugly over the circumferential portion of propeller hub to assist in locating the gauge on the propeller.

Alined horizontal surfaces 56 (Fig. 8), extending between the extensions 153 and 55, are adapted to rest on the face of the hub portion of the propeller to maintain horizontal alinement of the gauge.

The locating templet 50 is for use preferably in checking wooden propellers in production, and when so used the fingers 19 (Figs. 1 to 4) may be set to a master propeller while the templet 50 is held firmly in place on the hub portion of said master, as shown in Fig. 8. If desired, the fingers 19 and their supporting castings 18 may be set to dimensions taken from a drawing of the propeller.

While the gauge shown in Figs. 1 to 4 has been described as being applied to the back face of the propeller blades, it can just as easily be applied to the front face, if necessary or desirable.

The modified form of gauge shown in Figs. 5 and 6, instead of the finger type of templets or gauges, shown in Figs. 1 and 2, has four solid gauging templets 57, 58, 59 and 60 made to the exact dimensions of different linear sections of a particular metal or wooden propeller blade, such as shown in Fig. 5 in dot and dash lines, and obviously can be used only in checking blades corresponding to these dimensions. In the modified form an end templet 61, adapted to contact the end of the blade and a shank templet 62, adapted to engage the periphery of the shank of a metal blade, locate the gauge in linear and circumferential relationship to the blades being checked.

The templets 57 to 60 inclusive and 61, each has an angular clearance cut 63 which straddles a tubular member 64, upon which they are mounted and each of the templets 57 to 62 has two clearance holes through which extend corresponding screw studs 65 fast in similar opposed arms of corresponding castings 66.

The castings 66 have similar split hub portions 67 with borings therein which are a slip fit on the tube 64. Each of the castings 66 being provided with a clamp screw 68 which passes through a clearance hole in one extension of the split hub 67 and is threaded in another extension of said hub, said screws being used for firmly clamping their corresponding castings 66 firmly in place on the tube 64.

The templets 57 to 62, after being properly located, are clamped firmly against the face of their corresponding castings 66 by nuts 69 threaded on the screw studs 65.

Each of the studs 65 carries a clamping washer 70 interposed between the nuts 69 and the adjacent faces of the templets 57 to 62.

Each of the templets 57 to 60 (Figs. 5 and 6) has gauging surfaces 71, 72 and 73 which conform respectively to the leading and trailing edges and the back face of predetermined linear sections of the propeller blade for which they were made, and the locating templet 62 has arcuate surfaces 74 arranged to engage the circumference of the shank of the blade.

The bases 75 of the templets 57 to 62 and adjacent right-angle surfaces 76, opposite the leading-edge gauge portions, are so arranged with respect to the gauging surfaces of their respective templets as to locate said templets in two directions in proper relationship with each other when said bases 75 and surfaces 76 are alined in a plane.

Therefore, in adjusting the gauge shown in Fig. 5 for use, the castings 66 are first spaced along the tube 64 in approximate linear relationship to each other, approximately alined horizontally and temporarily clamped in place. Next the templets 57 to 62 are loosened on their respective castings and their bases 75 are placed in contact with a surface plate, or some other flat surface, while the surfaces 76 are simultaneously placed in contact with some plane surface at right-angles to the surface plate. The templets are then temporarily clamped in place and all the castings 66, with the exception of the casting for the templet 62, are again loosened on the tube 64. With the gauge resting on the surface plate, the end templet 61 is accurately located in relation to the templet 62 after which the templets 57 to 60 are accurately located with respect to the templet 61 and with respect to each other so as to bring their respective gauging surfaces in register with the sections of the blade to which they conform. The castings 66 are then securely clamped in place, after which the templets 57 to 62 are again loosened and again squared up in the manner described above, after which they are securely clamped in place.

Any suitable means may be used to space the templets laterally, such as, for example, inside micrometers, vernier calipers or gauging rods or blocks.

While the method of adjusting the gauge shown in Figs. 5 and 6 may seem complicated from the somewhat lengthy description thereof, it is in reality a quick and simple procedure and well within the scope of the average mechanic.

After the gauge is adjusted, the blades to be checked are nested therein with the tips contacting the templet 61 and the shank resting in the templet 62, as shown in Fig. 5, any deformity thereof being indicated by clearance between said blades and the gauging surfaces 71, 72 and 73 or failure of the blades to enter or nest in the gauge.

The procedure outlined directly above is preferably for shop use where a large number of identical metal blades are produced. If desired, the gauge may be used as here shown in Fig. 5, to check the blades of metal propellers when they are in place on an aircraft, or, if desired, the templet 62 may be replaced by the templet shown in Fig. 7 for checking metal propellers when they are in place on an aircraft.

In checking wooden propellers in production, the templet 62 may be replaced by the templet 50 shown in Figs. 8 and 9 and in checking wooden propellers when assembled on aircraft, the templet 17 (Figs. 1 and 2) may be substituted for the templet 62. In checking wooden propellers with the modified form of gauge, the use of the end templet 61 (Fig. 5) may be dispensed with if desired.

If desirable or necessary, the surfaces 73 of the templets 57 to 60 may be made to conform to the front face of the propeller blades, in which case the blades would be inserted in the gauge front face down instead of back face down, as shown in Figs. 5 and 6 and described above.

Summarizing briefly, the above specification discloses a highly efficient, compact and easily portable tool for gauging the blades of aircraft propellers when they are in place on aircraft or as they are being manufactured.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

I claim:

1. A readily portable device for gauging the blades of aircraft propellers, while said propellers are mounted on an aircraft comprising, a central supporting member of tubular form extending lengthwise of the blade, a locating device on the member, said device adapted to cooperate with the hub portion of the propeller to locate the member in proper relationship to the axis of the blade, elements adjustably mounted on the member and adapted to be spaced at intervals along the member to correspond to important radial sections of the blade, said elements adapted to extend at right-angles to the member and across the face of the blade, gauging fingers, two of which are adapted to be adjustably mounted on each element in reverse relationship to each other, and gauging surfaces on the fingers adapted to be moved into engagement with the leading and trailing edges and one face of the blade at several important radial sections thereof, while the member is retained in proper axial relationship to said blade, to set the gauge to the form and pitch of said blade so that companion blades may be compared therewith.

2. In a slip-on gauge for gauging the blades of aircraft propellers while said propellers are installed on an aircraft, the combination of a central supporting member of tubular form extending substantially the full length of the blades; adjustable elements adapted to be clamped along the supporting member at intervals corresponding to various radial sections of said blades, said elements having arms extending at right-angles to said member; two gauging fingers adjustably mounted on the arms of each of the elements, said fingers having confronting gauging surfaces adapted to be set in engagement with opposite edges and one face of one of the propeller blades; and means mounted on the supporting member and coacting with the hub portion of the propeller for locating the gauge in proper relationship to the axis and face of the propeller blade so that the form and pitch of the various radial sections of said blade may be compared with that of other companion blades by placing the gauge on said companion blades.

3. In a slip-on gauge for comparing the peripheral form and pitch of similar blades of propellers, said propellers having borings in the hub portions thereof, the combination of a central supporting member; a plurality of gauging elements mounted on the member and adapted to contact the leading and trailing edges and one face of the blades at different intervals throughout their length; and a locating part mounted on the member and having a plug portion adapted to engage the borings and horizontal surfaces adapted to engage the faces of the hub portions to locate the gauging elements in proper relation to the different intervals and the faces of the blades.

4. In a slip-on gauge for comparing the peripheral form and pitch of the blades of a propeller, said blades having tenons or shanks adapted to be secured in the borings of a hub member, said hub member having a machined split or a reference marking for each blade and similarly disposed with respect thereto, said splits or markings being in a plane in relation to the center of the axis of the propeller blades, the combination of a central supporting member; a plurality of settable gauging elements mounted on the supporting member and adapted to be set to contact the leading and trailing edges and one face of one of the blades at different intervals throughout its length; a locating part mounted on the supporting member and adapted to engage the blade shank and the hub member to locate the gauge in proper relationship to said blade; and a measuring device on the locating part cooperating with the splits in the hub member or the reference markings thereon, to compare the relationship of the faces of the blades of the propeller with respect to the plane of rotation of said propeller.

5. In a gauge for comparing the peripheral form and pitch relationship of the blades of a propeller, the combination of a central supporting member; a plurality of templets having gauging surfaces formed to fit the leading and trailing edges and one face of the blades at predetermined intervals or sections throughout their length, said templets adjustably mounted on the supporting member and adapted to be spaced thereon to correspond to the predetermined intervals or sections; right-angle surfaces on the templets for locating said templets in proper relationship to the peripheral form and pitch of the blades; and means mounted on the member for locating the templets in register with the predetermined intervals or sections.

6. In a slip-on gauge for gauging the blades of aircraft propellers while said propellers are installed on an aircraft, the combination of a central supporting member of tubular form; a plurality of arms adjustably mounted on the member and adapted to be positioned lengthwise and radially thereon in relation to various predetermined radial sections of the blades to be gauged; a plurality of gauging devices adjustably mounted on the arms and adapted to be set to conform to the peripheral form and pitch of the various blade sections to be gauged; and a device mounted on one end of the member for locating the gauging devices in proper relationship to the blades.

7. In a slip-on gauge for gauging aircraft propeller blades while said propeller blades are installed on an aircraft, the combination of a central supporting member of tubular form; a plurality of elements supported by the supporting member and adjustable lengthwise and radially thereon in relation to various predetermined radial sections of the blades to be gauged; gauging fingers adjustably supported by the elements, said fingers having gauging surfaces adapted to be set to the peripheral form and pitch of the various predetermined radial sections of a blade for comparing other similar blades therewith; and means on the tubular supporting member and coacting with the hub portion of the blade to locate the fingers in proper relationship to the predetermined radial sections of the blade.

8. In a slip-on gauge for gauging the blades of aircraft propellers while said propellers are installed on an aircraft, the combination of a central supporting member of tubular form; a plurality of elements adjustably mounted on the supporting member and spaced thereon at various intervals lengthwise of one of the blades, said intervals corresponding to important radial sections of said blade; means comprising gauging parts mounted on the elements and adapted to be adjusted so as to contact the leading and trailing edges and one face of the blade at the intervals corresponding to the position of the elements; and means adjustably mounted on the tubular member to locate the gauge in proper axial and radial relationship to the blade.

9. In a portable device for gauging the blades of an aircraft propeller while said propeller is installed on an aircraft, said blades having hub portions, the combination of a central supporting member of tubular form; clamp-brackets mounted on the supporting member and arranged to be adjusted lengthwise and radially on the member to conform to important sections of the propeller blades; two gauging fingers mounted opposite each other on each of the brackets by means of slots in said fingers in cooperation with screws in the brackets; confronting gauging surfaces on the fingers adapted to be adjusted by means of the slots and screws to contact the leading and trailing edges and one face of the blades at the important sections thereof; and means on the member cooperating with the hub portions to locate the gauge in proper axial and radial relationship to the blades.

10. In a device of the class described adapted to be used to gauge the blades of an aircraft propeller while said propeller is installed on an aircraft, said blades having a shank which is clamped in a boring in a split extension of a hub portion; the combination of means settable to the peripheral form and pitch of different important radial sections of one of the blades and after being so set, adapted to be placed on the other companion blades to compare the relative form and pitch of the different blades; means on the settable means cooperating with the shank and the hub portion to locate the settable means in proper axial and radial relationship to the blades; and means on the locating means cooperating with the split in the extension of the hub portion to indicate the angular setting of the blades with relation to the plane of rotation of the propeller.

11. In a device of the class described adapted to be used to gauge the blades of an aircraft propeller while said propeller is installed on an aircraft, said blades having a shank which is clamped in a boring in a split extension of a hub portion, the combination of a central supporting member of tubular form; arms on the supporting member settable lengthwise and angularly with relation to the blades to be gauged; gauging parts mounted on the arms and settable to the peripheral form and pitch of any desired one of the blades to compare the other companion blades therewith; means mounted on the member and cooperating with the shank and the hub portion to locate the settable means in proper radial relationship to the blades; and means on the locating means cooperating with the split in the hub extension to indicate the angular setting of the blades with relation to the plane of rotation of the propeller.

12. In a portable gauge of the slip-on type for gauging the blades of aircraft propellers while said propellers are in operating position, said propellers having hub portions, the combination of a central supporting member of tubular form; elements adjustably mounted on the tubular member and adapted to be spaced thereon to correspond to various predetermined important radial sections of the blades, said elements having surfaces adapted to engage one face and the leading and trailing edges of said radial sections of the blades to gauge the peripheral form and pitch of said blades; and a locating device adjustably mounted on one end of the tubular member and cooperating with the hub portion of the blades for locating the elements in proper axial and radial relationship to said blades.

13. In a slip-on gauge of the class described for comparing the peripheral form and pitch of the blades of an aircraft propeller while said propeller is installed on an aircraft, said propeller having a flanged hub portion for mounting said propeller on the engine of said aircraft, the combination of a central supporting member; adjustable arms adapted to be clamped on the member after being adjusted to correspond to various important radial sections of the blades; blade-contacting elements adjustably mounted on the arms and adapted to be set to the peripheral form and pitch of the various important radial sections of one of the blades; and a locating device mounted on the member and arranged to be engaged with the periphery of the hub flange and the face of the hub portion of the blade to locate the blade-contacting elements in proper axial and radial relationship to the various important radial sections of the blade, after which said gauge may be removed from the blade and slipped on the companion blade or blades for comparing the peripheral form and pitch of said blades.

JEAN A. ROCHÉ.